United States Patent

McIntosh

[15] 3,673,434

[45] June 27, 1972

[54] NOISE IMMUNE FLIP-FLOP CIRCUIT ARRANGEMENT

[72] Inventor: Michael D. McIntosh, Greencastle, Pa.

[73] Assignee: Landis Tool Company

[22] Filed: Nov. 26, 1969

[21] Appl. No.: 880,080

[52] U.S. Cl. ..............................307/247, 307/208, 307/215, 307/289

[51] Int. Cl. ..............................H03k 3/12

[58] Field of Search..................307/215, 289, 290, 291, 247, 307/208

[56] References Cited

UNITED STATES PATENTS

| | | | |
|---|---|---|---|
| 3,206,683 | 9/1965 | Davis | 307/215 |
| 3,435,257 | 3/1969 | Lawrie | 307/289 |
| 3,473,045 | 10/1969 | Niemann | 307/291 |
| 3,509,381 | 4/1970 | Marshall | 307/291 |
| 3,514,637 | 5/1970 | Herrmann | 307/247 |
| 3,518,552 | 6/1970 | Carlow | 307/215 |
| 3,527,958 | 9/1970 | Young | 307/291 |

*Primary Examiner*—Donald D. Forrer
*Assistant Examiner*—David M. Carter
*Attorney*—Diller, Brown, Ramik & Holt

[57] ABSTRACT

A noise immune data processing flip-flop circuit arrangement is described in which the clock input for one or more transition triggered flip-flops is fed to the clock input terminal of respective flip-flops via a NAND circuit means which prevents the start of charging of a capacitor, across which triggering voltage is to appear, via a resistor until an input pulse fed to the NAND circuit appears which has at least a given duration thereby making the flip-flop immune to noise pulses of shorter duration. Additionally, the pulse for triggering must have a still greater duration sufficiently long enough to allow the capacitor to reach the transition voltage level for the flip-flop providing further protection from false triggering by noise pulses of still greater duration than the given duration. The clear input for the flip-flop is also provided with NAND circuit means, and the Q and $\overline{Q}$ outputs from the flip-flop are fed to NAND circuits which are connected to a single voltage supply source via resistors.

14 Claims, 6 Drawing Figures

INVENTOR
Michael D. McIntosh

BY Dulin Brown Ramik & Hu[illegible]
ATTORNEYS

INVENTOR
Michael D. McIntosh
BY Diller, Brown, Ramik & Holt
ATTORNEYS

INVENTOR
Michael D. McIntosh

BY
Dillon, Brown, Ramik & Ha...
ATTORNEYS

NOISE IMMUNE FLIP-FLOP CIRCUIT ARRANGEMENT

This invention relates to a new and improved electrical transition triggered flip-flop circuit and, more particularly to a new and improved transition triggered flip-flop circuit which includes means for eliminating the effects of undesirable noise on the input circuits of a transition triggered flip-flop circuit.

Bi-stable circuits for use in electrical switching systems, computers, data processing apparatuses, and machine control arrangements are well known. One example of a transition triggered flip-flop circuit features direct clear and pre-set inputs, and complementary Q and $\overline{Q}$ outputs. Generally input information is transferred to the Q output on the positive edge of a clock pulse. Clock triggering occurs at a voltage level of the clock pulse, and is not directly related to the transition time of the positive going pulse, and a race condition in which circuits activated by the flip-flop output tend to be triggered prematurely exists.

In the prior art arrangement noise pulses may appear with the clock pulse input signals, and undesirably trigger the transition triggered flip-flop circuit causing false and ill-timed transfer between the data input, and the outputs of the flip-flop circuit. Similarly, the clear and set inputs in transition triggered flip-flops may likewise be undesirably triggered by the appearance of noise pulses on the inputs of either the clear and set terminals of a data processing flip-flop circuit.

It is accordingly an object of the present invention to provide an improved highly reliable transition triggered flip-flop circuit which is immune to noise pulses of limited duration.

It is a further object of the present invention to isolate the clock input terminal of a transition triggered flip-flop circuit from noise on a clocked input circuit.

It is a further object of the present invention to isolate other input terminals of flip-flop circuits, such as clear and set terminals, from noise appearing on the clear and set input circuits.

It is yet another object of the present invention to provide a transition triggered flip-flop circuit having logic circuit means for controlling the discharging and charging of a capacitor associated with the clock input terminal of the flip-flop circuit.

It is yet another object of the present invention to provide a triggered flip-flop circuit with a NAND circuit means for controlling the charging and discharging of a capacitor associated with the clock input terminal of the flip-flop circuit.

It is still a further object of the present invention to provide an improved transition triggered flip-flop circuit having NAND circuit means coupled to clear or set input terminals of the circuit for applying clear or setting input signals thereto.

With the above and other objects in view, as will hereinafter appear, the nature and features of the invention will be more clearly understood by reference to the following description, the appended claims and the several figures illustrated in the accompanying drawings.

Figure 1A:
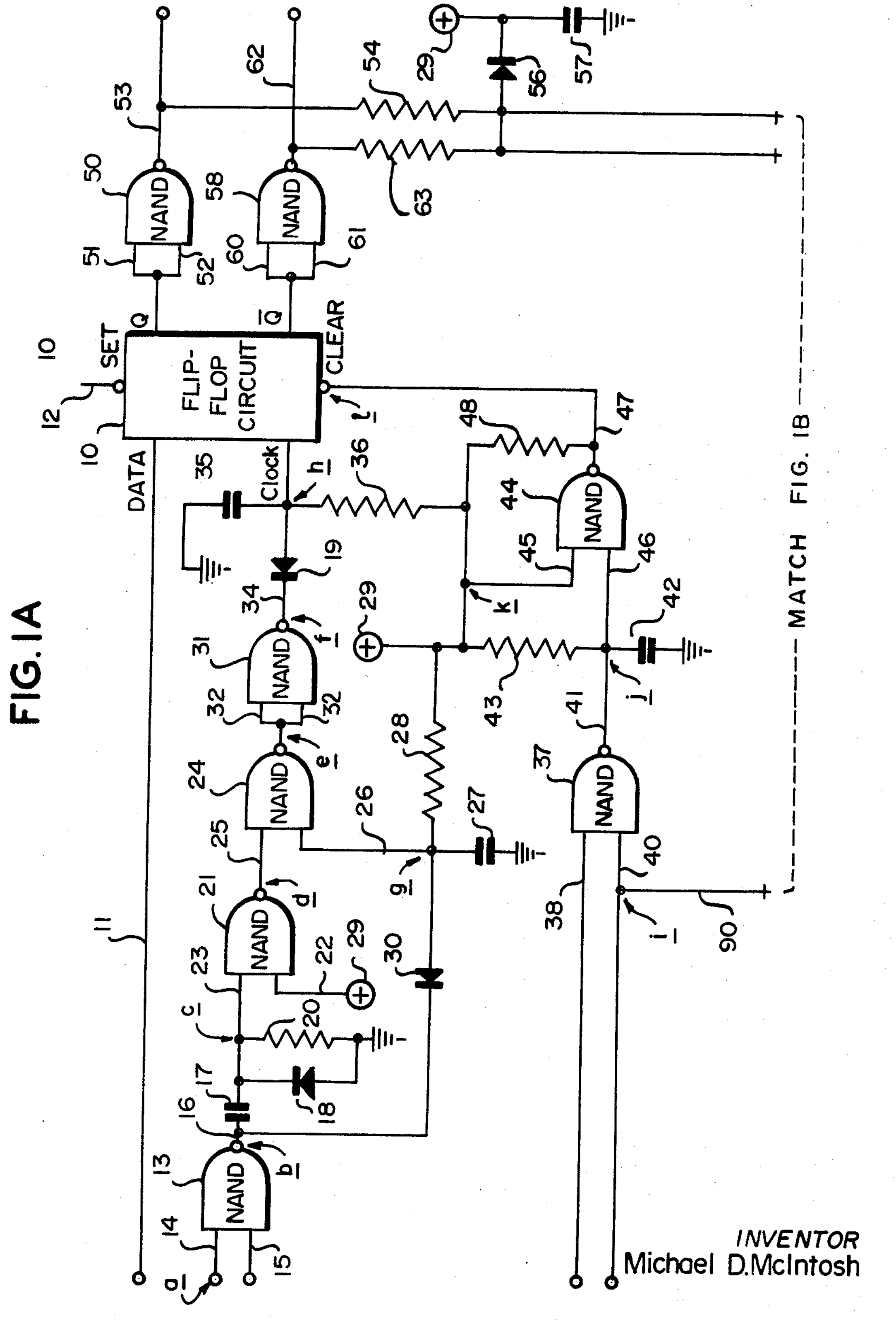
FIGS. 1A and 1B are a schematic and block diagram of data processing circuit arrangement utilizing flip-flop circuits constructed in accordance with the present invention.
Figure 1B:
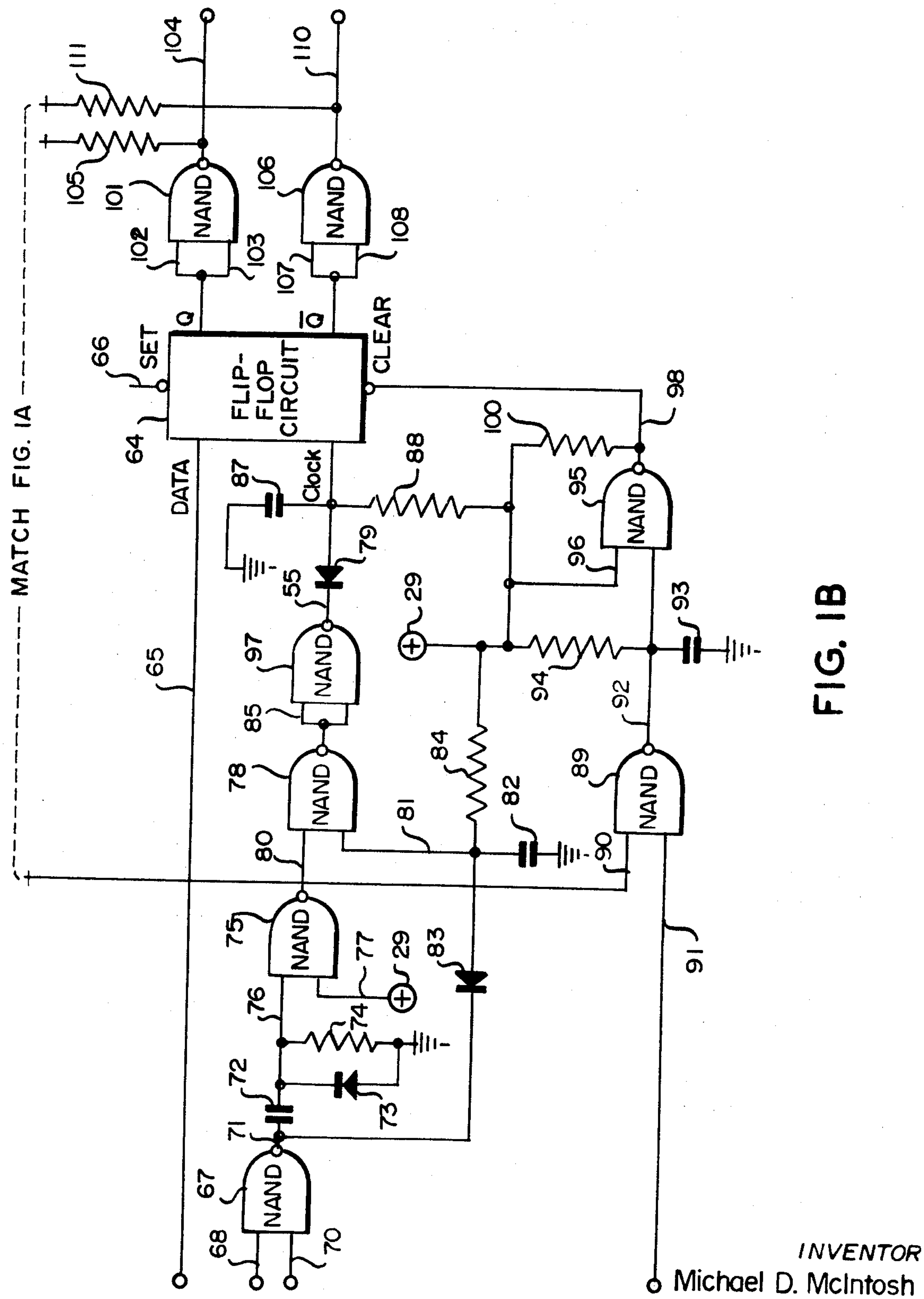

With reference to FIGS. 1A and 1B, a data processing circuit arrangement is illustrated which includes a transition edge-triggered flip-flop circuit 10 which has its data input terminal connected to a data input lead 11, a set input terminal connected to a set input lead 12 and a clear input terminal connected to a clear input lead 47. The flip-flop circuit is provided with complementary Q and $\overline{Q}$ outputs.

In order to provide a clock input to the flip-flop circuit 10, a logic circuit arrangement is utilized. The logic circuit arrangement includes a NAND circuit 13 having a pair of input leads 14 and 15. Either one or both of the input leads 14 and 15 is to be connected to a source of clock pulses. One of the leads may alternatively be connected to a source of positive potential. The NAND circuit 13 is provided with an output lead 16 connected to one plate of a capacitor 17 having its other plate connected to lead 23 forming one input of a two-input positive NAND circuit 21. The other input of the NAND circuit 21 is connected to a source of positive potential appearing on lead 22. A diode 18 and a resistor 20 are connected in series between a point of reference potential and the input lead 23, and in parallel with one another.

The NAND circuit 21 is provided with an output lead 25 which is connected to one input of a two-input positive NAND circuit 24. The other input of the NAND circuit 24 is connected via lead 26 to a junction point between a capacitor 27 and resistor 28 which are connected in series with one another across a source of positive voltage appearing between a point of reference potential and terminal 29. The junction between the capacitor 27 and the resistor 28 is also connected to the anode terminal of diode 30 which has its cathode terminal connected to the output lead 16 of the NAND circuit 13.

The output of the NAND circuit 24 is connected via leads 32 and 33 to the two inputs of a two-input positive NAND circuit 31. The NAND circuit 31 has its output connected via a lead 34 to the cathode electrode of a diode 19 which has its anode electrode connected to a junction between a capacitor 35 and resistor 36 which are connected in series across a source of positive voltage illustrated as being between a reference point and terminal 29. The clock input terminal of the flip-flop circuit 10 is also connected to the junction between the capacitor 35 and the resistor 36 completing the clock input circuit.

An input for the clear terminal of the flip-flop circuit 10 is provided by a logic circuit means including a two-input positive NAND circuit 37 having at least one of its inputs connected to clear pulse input lead 40 adapted to be connected to a source of clear pulses. The other input of the NAND circuit 37 is connected to lead 38 which may be connected either to a source of positive potential or to the clear pulse source in a similar fashion to the lead 40. An output of the NAND circuit 37 is connected via lead 41 to a junction between a capacitor 42 and a resistor 43 which are connected in series across a source of positive voltage illustrated as a point of reference potential and terminal 29. The junction between the capacitor 42 and the resistor 43 is also connected to an input of a two-input positive NAND circuit 44 which has its other input connected via lead 45 to positive voltage terminal 29. The NAND circuit 44 has its output connected to the positive terminal 29 via a resistor 48 and to the clear terminal of the flip-flop circuit 10 by lead 47.

The flip-flop circuit 10 has its Q output connected to the input terminals of a two-input positive NAND circuit 50 via leads 51 and 52. An output terminal of the NAND circuit 50 is connected to lead 53 which is connected by resistor 54 to the anode electrode of a diode 56 which has its cathode electrode connected to a positive voltage terminal 29. A capacitor 57 is connected between the positive voltage terminal 29 and a point of reference potential. The $\overline{Q}$ output from the flip-flop circuit 10 is connected to both input terminals of a two-input positive NAND circuit 58 via leads 60 and 61. The output terminal of the NAND circuit 58 is connected to lead 62 and via resistor 63 to the anode of the diode 56.

A second transition edge-triggered flip-flop circuit 64, which has its data input terminal connected to a data input lead 65, is illustrated in FIG. 1B. The circuit includes a set input terminal connected to a set input lead 66 and a clear input terminal connected to a clear input lead 98. The flip-flop circuit, like circuit 10, is provided with comple-mentary Q and $\overline{Q}$ outputs.

In order to provide a clock input to the flip-flop circuit 64, a logic circuit arrangement is utilized. The logic circuit arrangement includes a NAND circuit 67 having a pair of input leads 68 and 70. Either one or both of the input leads 68 and 70 is adapted to be connected to a source of clock pulses. One of the leads may alternatively be connected to a source of positive potential. The NAND circuit 67 is provided with an output lead 71 connected to one plate of a capacitor 72 having its other plate connected to lead 76 forming one input for a two-input positive NAND circuit 75. The other input of the NAND circuit 75 is connected to a source of positive potential at terminal 29 by lead 77. A diode 73 and a resistor 74 are connected in series between a point of reference potential and the input lead 76, and is parallel with one another.

The NAND circuit 75 is provided with an output lead 80 connected to one input of a two-input positive NAND circuit 78. The other input of the NAND circuit 78 is connected by lead 81 to a junction point between a capacitor 82 and a resistor 84 which are connected in series with one another across a source of positive voltage appearing between a point of reference potential and the terminal 29. The junction between the capacitor 82 and the resistor 84 is also connected to the anode terminal of a diode 83 which has its cathode terminal connected to the output lead 71 on the NAND circuit 67.

The output of the NAND circuit 78 is connected by leads 85 and 86 to two inputs of a two-input positive NAND circuit 97. The NAND circuit 97 has its output connnected by a lead 55 to the cathode electrode of a diode 79 which has its anode electrode connected to a junction between a capacitor 87 and resistor 88 which are connected in series across a source of positive voltage illustrated as being between a reference point and terminal 29. The clock input terminal of the flip-flop circuit 64 is also connected to the junction between the capacitor 87 and the resistor 88 completing the clock input circuit for the flip-flop circuit 64.

An input for the clear terminal of the flip-flop circuit 64 is provided by a logic circuit means including a two-input positive NAND circuit 89 having at least one of its inputs connected to clear pulse input lead 90 which, in turn, is connected to lead 40. Lead 40, as pointed out above, is adapted to be connected to a source of clear pulses. The other input of the NAND circuit 89 is connected to lead 91 which may be connected either to a source of positive potential or to the clear pulse input lead 90. An output of the NAND circuit 89 is connected by lead 92 to a junction between a capacitor 93 and a resistor 94 which are connected in a series across a source of positive voltage illustrated as a point of reference potential and terminal 29. The junction between the capacitor 93 and the resistor 94 is also connected to one input of a two-input positive NAND circuit 95 which has its other input connected by lead 96 to positive voltage terminal 29. The NAND circuit 95 has its output connected to the positive terminal 29 via a resistor 100, and to the clear terminal of the flip-flop circuit 64 by the lead 98.

The flip-flop circuit 64 has its Q output connected to the input terminals of a two-input positive NAND circuit 101 by leads 102 and 103. An output terminal of the NAND circuit 101 is connected to lead 104 which is connected via a resistor 105 to the anode electrode of the diode 56 which has its cathode electrode connected to the positive voltage terminal 29. A capacitor 57 is connected between the positive voltage terminal 29 and a point of reference potential. The $\overline{Q}$ output from the flip-flop circuit 64 is connected to both input terminals of a two-input positive NAND circuit 106 by leads 107 and 108. The output terminal of the NAND circuit 106 is connected to lead 110 and, via resistor 111, to the anode of the diode 56.

While neither of the set input terminals of flip-flop circuit 10 or flip-flop circuit 64 is illustrated as being connected to logic circuit means, it is to be understood that either or both of the set input leads may be associated with additional logic circuit means constructed in the same manner as the logic circuit means associated with the clear input terminals of flip-flop circuits 10 and 64.

Figure 2:
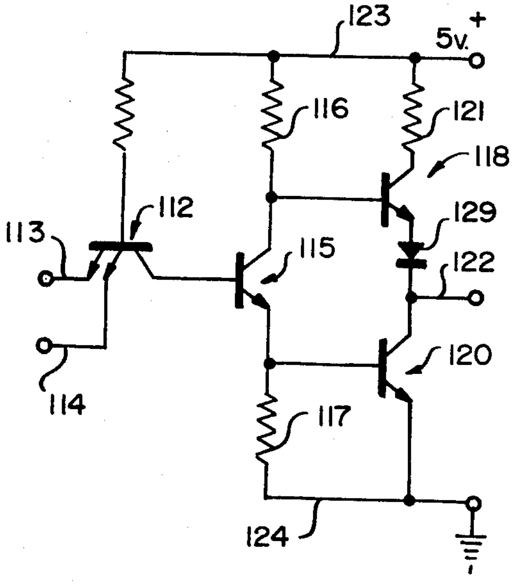
FIG. 2 is a schematic diagram of a two input positive NAND circuit having a bi-polar output which may be utilized in the present invention.

In FIG. 2, a two-input NAND circuit of known construction and operation is illustrated. The circuit includes an input n-p-n transistor 112 which has two emitters connected respectively to input leads 113 and 114. The transistor 112 has its collector lead connected to the base electrode of a n-p-n transistor 115. The transistor 115 is arranged with its collector connected to a positive voltage appearing on lead 123 via a resistor 116, and its emitter connected to ground connection 124 via a resistor 117. The collector of the transistor 115 is conductively coupled to the base of a n-p-n transistor 118, and its emitter is conductively coupled to the base of a n-p-n transistor 120. The collector of the transistor 120 is connected to the emitter of the transistor 118 via a diode 129 having its anode directly connected to the emitter electrode of the transistor 118. An output lead 122 is also connected to the collector of the transistor 120. The collector of the transistor 118 is connected to the lead 123 on which positive voltage appears, and the emitter electrode is connected to a point of reference potential illustrated as ground. In operation, whenever, the two inputs to the transistor 112 indicate a logical one condition, the output appearing on lead 122 is in a logical zero condition. Whenever either of the inputs represent a logical zero condition the output is in a logical one condition in accordance with the function of NAND circuits generally.

Figure 3:
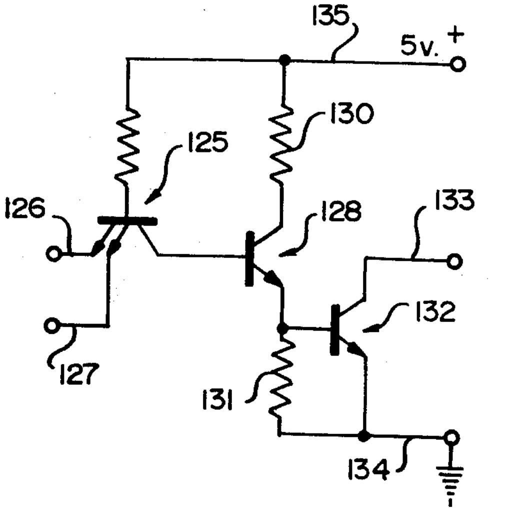
FIG. 3 is a schematic diagram of a two input positive NAND circuit having an open-collector output which may be utilized in the present invention.

A two-input NAND circuit of known construction, as illustrated in FIG. 3, includes an input n-p-n transistor 125 which is provided with two emitters connected respectively to input leads 126 and 127. The transistor 125 has its base connected to a resistor to a lead 135 on which a positive supply voltage appears. The collector of the transistor 125 is conductively coupled to the base electrode of an n-p-n transistor 128 which has its collector electrode connected to the lead 135 via a resistor 130. The emitter of the transistor 128 is connected to a reference potential appearing on a lead 134 via a resistor 131. The emitter is conductively connected to the base of an n-p-n transistor 132 which has its emitter connected to the point of reference potential illustrated as being ground. The collector of the transistor 132 is connected to the lead 133. In operation, whenever the input to the base of the transistor 132 places it in a conductive condition a low impedance condition exists thereby designating a logical zero output condition on the lead 133. Whenever the input at the base of the transistor 132 places it in a non-conductive high impedance condition, a logical one output condition exists on the lead 133.

NAND circuits 13, 21, 24 and 31 illustrated in FIG. 1A and the corresponding NAND circuits utilized in conjunction with the clock input to the flip-flop circuit 64 shown in FIG. 18 may advantageously be constructed as the NAND circuit illustrated in FIG. 2. The NAND circuit illustrated in detail in FIG. 3 may be advantageously utilized as the NAND circuits 37, 44, 50 and 58 illustrated in FIG. 1A and the corresponding NAND circuits shown in FIG. 1B.

Figure 4:
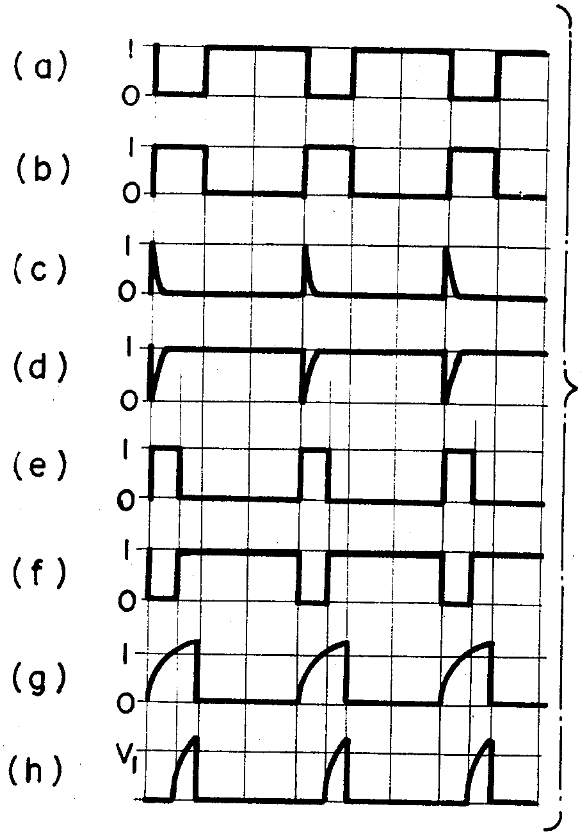
FIG. 4 illustrates waveforms at various points in the circuit associated with the clock input of the transition triggered flip-flop circuit of the present invention to aid in the understanding of the operation thereof.

In operation, the data processing circuit illustrated in FIG. 1A and FIG. 1B functions to transfer information appearing on data input leads 11 and 65 to the Q output terminal of flip-flop circuits 10 and 64, respectively, upon the occurrence of a positive going transition at the respective clock input terminals of each of the flip-flop circuits 10 and 64. As illustrated, the clock and clear input terminals of each of the flip-flop circuits 10 and 64 is provided with logic circuitry which makes the flip-flop circuits immune to noise in the form of pulses which may appear on the clock and clear inputs to the flip-flop circuits. Since a portion of the circuit arrangement shown in FIG. 1B functions essentially the same as the circuit illustrated in FIG. 1A, only the operation of that portion of the circuit illustrated in FIG. 1A will be discussed in detail with reference to the waveforms shown in FIG. 4 and FIG. 5. Turning to FIG. 1A, let it be assumed that data appears on input lead 11 which is to be transferred to the Q output of flip-flop circuit 10 upon the occurrence of a given voltage level of a positive going transition appearing at the clock input terminal of the transition triggered flip-flop circuit 10. Let it assumed that the diode 19 is initially conducting. A voltage drop appears across the resistor 36, and the voltage across the capacitor 35 is consequently low representing a logical zero condition at point *h*, the clock input for the flip-flop circuit 10. Let it be further assumed that the diode 30 is conductive, voltage drop appears across the resistor 28, and the low voltage representing a logical zero condition appears across the the capacitor 27 and, thus, at point *g* and the lead 26. A clock pulse input wave (a) as illustrated in FIG. 4 is applied to point *a* providing a logical zero voltage condition to exist on one input of the NAND circuit 13. Since a logical zero voltage condition on either input of a positive NAND circuit results in a logical one voltage condition on its output, a pulse wave (b) as illustrated in FIG. 4 appears at point *b*. As the waveform at point *b* goes positive, presenting a logical one condition, diode 30 is rendered non-conductive, and the capacitor 27 begins to charge exponentially toward the voltage appearing on the terminal 29 via the resistor 28 as illustrated by waveform (g) in FIG. 4. Thus, the pre-existing zero voltage condition at point *g* begins to change toward a logical one voltage condition depending on the time constant of the charging circuit for the capacitor 27.

The positive going pulse wave appearing at point *b* is also applied to a differentiating circuit consisting of the capacitor 17 and the resistor 20. Since the resistor 20 is shunted by the diode 18 which has its anode connected to a point of reference potential, negative going pulses resulting from differentiation are essentially short circuited to ground, and positive going pulses as illustrated in waveform (c) appear at point *c* as one input to the NAND circuit 21 having its other input connected to a point of positive potential. Since the two positive inputs representing logical one voltage conditions appear on both inputs of the NAND circuit 21, a negative going pulse of short duration as illustrated in waveform (d) appears at point *d* as one of the inputs to the NAND circuit 24 thus assuring a logical one voltage condition to exist at point *e* and at the two inputs of the NAND circuit 31 thereby assuring the existence of a logical zero condition at point *f* as illustrated by waveform (f). The diode 19 remains in con-ductive condition, and the flip-flop circuit 10 is not as yet triggered by the clock pulse.

Since the negative going pulse appearing at point *d* is of short duration, a logical one voltage condition is restored to point *d*; however, because both inputs of the NAND circuit 24 must be in a logical one state before its output changes to a logical zero voltage condition, the voltage appearing at point *e* remains the same until the voltage across the capacitor 27, charges towards a voltage level which appears at the terminal 29 to place a logical one voltage condition on lead 26. When logical one voltage conditions exist on both leads 25 and 26, point *e* assumes a logical zero voltage condition thereby establishing a positive logical one voltage condition at point *f*. The positive voltage appearing at point *f* places diode 19 in a non-conductive state allowing the capacitor 35 to begin charging towards the voltage level appearing on the positive terminal 29 via the resistor 36. As the capacitor 35 charges towards the positive voltage level appearing on the positive terminals 29, the voltage across the capacitor 35 passes the transisition voltage for the clock input of the flip-flop circuit 10, the flip-flop circuit 10 operates to pass data to its output Q and thence to output lead 53 by the action of the NAND circuit 50.

The capacitor 35, even after flip-flop circuit 10 has been clocked, continues to charge towards a positive voltage level established by the positive voltage appearing on the terminal 29. In order that the flip-flop circuit 10 may be made responsive to the occurrence of a later clock pulse, the capacitor 35 must again be discharged so as to place a logical zero input voltage level at point *h* by providing that the diode 19 again becomes conductive before the appearance of the leading edge of a later clock pulse. The capacitor 35 is discharged and the point *h* placed at a zero logical voltage level by the action of the trailing edge of the clock pulse applied to point *a*. Briefly stated, upon the appearance of a logical one voltage level at point *a*, a logical zero voltage level appears at point *b* causing diode 30 to become conductive quickly discharging the capacitor 27 and thereafter drawing current from the positive terminal 29 placing point *g* at a logical zero voltage level. Whenever a logical zero voltage level appears on the input lead 26 of the NAND circuit 24, a logical one voltage level appears at point *e* which, in turn, causes a logical zero voltage level to exist at point *f* thereby placing the diode 19 in a conductive condition discharging the capacitor 35. Thus, a logical zero voltage condition is established at point *h* and the flip-flop circuit 10 is accordingly in condition to again respond to a later clock pulse signal.

As can be seen from the foregoing, the flip-flop circuit 10 is essentially non-responsive to pulse noise which may appear on the clock pulse input applied to point *a* which has a pulse duration less than the width selected for the pulses. Firstly, the width of pulses appearing at point *a* must be of sufficient duration to allow the voltage appearing across the capacitor 27 to reach a logical one level as an input to the NAND circuit 24. Secondly, the duration of the pulse appearing at point *a* must be still of greater length so as to allow the voltage appearing across the capacitor 35 to reach the voltage transition level for the flip-flop circuit 10 after the voltage across the capacitor 27 reaches the logical one level. Thus, it can be seen that the capacitor 35 is not allowed to begin to charge towards a positive voltage level until a pulse at least of a given width appears at point *a*, and flip-flop circuit 10 is not allowed to be clocked until the voltage across the capacitor 35 reaches the transition voltage level of the flip-flop circuit 10 because the pulse applied to point *a* is of still greater duration.

Figure 5:
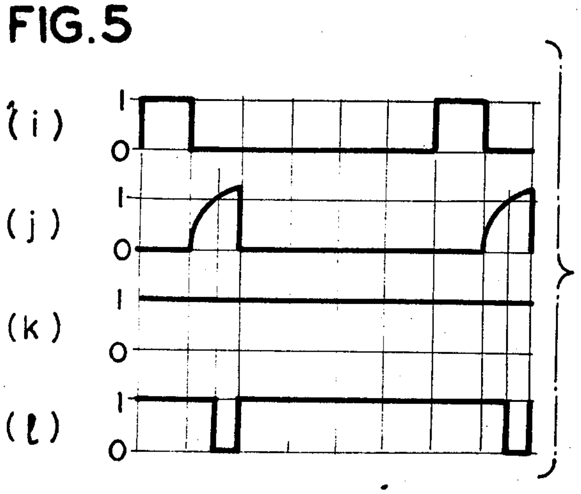
FIG. 5 illustrates waveforms at various points in the circuit associated with the clear terminal of the transition triggered flip-flop circuit of the present invention to aid in the understanding of the operation thereof.

The function of the clear input to the flip-flop circuit 10 will be readily understood with reference to the waveform set out in FIG. 5. Let it be assumed that the appearance of a logical zero voltage condition on the lead 47 will clear the flip-flop circuit 10, and that a logical one voltage condition is initially provided at point *i* as shown by waveform (i) illustrated in FIG. 5. In order to clear the condition of the flip-flop circuit 10, a pulse clearing input signal is applied to the input lead 40 and appears at point *i* as input wave (i) shown in FIG. 5. Lead 38 may either be connected to a source of positive potential or to the same clock source as the lead 40. Because of the logical one voltage condition existing on the inputs to the NAND circuit 37, its output appearing at point *j*, the junction between the capacitor 42 and the resistor 43 is initially at a logical zero voltage condition which, in turn, causes the output of the NAND circuit 44 to be in a logical one voltage condition. Upon the appearance of a negative going pulse on the lead 40, the capacitor 42 begins to charge towards the positive voltage appearing on the positive terminal 29 as illustrated in waveform (j) shown in FIG. 5. As the capacitor 42 charges towards the positive voltage appearing on the terminal 29, its voltage obtains a sufficient value to establish a logical one voltage condition at point *j* establishing a logical one voltage condition on one input of the NAND circuit 44 connected to the lead 46. Since the other input of the NAND circuit 44 is connected directly to a positive potential on the terminal 29, a logical one voltage condition exists on both inputs of the NAND circuit 44 causing a logical zero condition to exist at point *l*, the clear input for the flip-flop circuit 10 thereby clearing the flip-flop circuit.

It can be seen from the foregoing, that the flip-flop circuit 10 is provided with a clearing input circuit arrangement which requires that clear input pulses have durations sufficiently long to allow the capacitor 42 to charge to a voltage level through the resistor 43 corresponding to the logical one voltage input level required for the NAND circuit 44. Thus, the flip-flop circuit 10 is immune to noise in the form of pulses on its clearing input circuit of insufficient duration to allow the capacitor 42 to obtain a logical one voltage condition thereacross.

The operation of the clock and clear input circuits for the flip-flop circuit 64, is essentially identical to the operation of the clock and clear input circuits for the flip-flop circuit 10 as discussed above.

In one particular embodiment of the invention, flip-flop circuits 10 and 64 were composed of integrated circuit SN7474N. The NAND circuits 37, 44, 50, 58, 89, 95, 101 and 106 were composed of two integrated circuits SN7401N. The NAND circuits 13, 21, 24, 31, 67, 75, 78 and 97 were composed of two integrated circuits SN7400N. The integrated circuits are available from Texas Instruments Incorporated. Additional components used in the particular embodiments are identified as follows:

| | | | |
|---|---|---|---|
| Resistor **20** | 680 Ω | Capacitor **27** | 0.01 M.F.C. |
| Resistor **28** | 1.8k Ω | Capacitor **35** | 0.01 M.F.D. |
| Resistor **36** | 1.0k Ω | Capacitor **42** | 0.05 M.F.D. |
| Resistor **43** | 1.8k Ω | Capacitor **57** | 10.0 M.F.D. |
| Resistor **48** | 1.8k Ω | Capacitor **72** | 0.1 M.F.D. |
| Resistor **54** | 1.8k Ω | Capacitor **82** | 0.01 M.F.D. |
| Resistor **63** | 1.8k Ω | Capacitor **87** | 0.01 M.F.D. |
| Resistor **74** | 680 Ω | Capacitor **93** | 0.05 M.F.D. |
| Resistor **84** | 1.8k Ω | Diode **18** | 1N914 |
| Resistor **88** | 1.0k Ω | Diode **19** | 1N914 |
| Resistor **94** | 1.8k Ω | Diode **30** | 1N914 |
| Resistor **100** | 1.8k Ω | Diode **56** | 10D2 |
| Resistor **105** | 1.8k Ω | Diode **73** | 1N914 |
| Resistor **111** | 1.8k Ω | Diode **79** | 1N914 |
| Capacitor **17** | 0.1 M.F.D | Diode **83** | 1N914 |

It is to be understood that although the invention has been specifically described in conjunction with a particular embodiment, that numerous modifications may readily be made without departing from the spirit of the invention.

What is claimed is:

1. A transition triggered flip-flop circuit comprising a data input means and at least one output means, a clocking input means, a first capacitor and a first resistor connected in series across a voltage source, said clocking input means being connected to a first junction between said first capacitor and said first resistor, a first logic circuit means having at least two input terminals and an output terminal, said output terminal being coupled to said first junction, said input terminals being coupled to an output terminal of a second logic circuit means having two input terminals one of which is coupled to an output terminal of a third logic circuit means and the other of which is coupled to a second junction between a second capacitor and a resistor, said second capacitor and said second resistor being connected in series across a voltage source, said third logic circuit means having one input terminal connected to a source of potential and a second input terminal coupled to an output terminal of a fourth logic circuit means via a third capacitor and to a point of reference potential via a third resistor, the output terminal of said fourth logic circuit means being connected to said second junction and said fourth logic circuit means having at least two input terminals.

2. A circuit as claimed in claim 1 wherein each of said logic circuit means comprises respective individual NAND circuit means.

3. In a transition triggered flip-flop circuit having a data input means and at least one output means, a clocking input means, a first capacitor and a first resistor connected in series across a voltage source, said clocking input means being connected to a junction between said first capacitor and said first resistor, and NAND circuit means coupled to said junction for controlling the charging and discharging of said first capacitor, said NAND circuit means comprising a first NAND circuit having at least two input terminals and an output terminal, said output terminal being coupled to said first junction, said input terminals being coupled to an output terminal of a second NAND circuit having two input terminals one of which is coupled to an output terminal of a third NAND circuit and the other of which is coupled to a second junction between a second capacitor and a resistor, said second capacitor and said second resistor being connected in series across a voltage source, said third NAND circuit having one input terminal connected to a source of potential and a second input terminal coupled to an output terminal of a fourth NAND circuit via a third capacitor and to a point of reference potential via a third resistor, the output terminal of said fourth NAND circuit being connected to said second junction and said fourth NAND circuit having at least two input terminals.

4. A circuit as claimed in claim 3 wherein a diode is connected between the output terminal of said first NAND circuit and said first junction.

5. A circuit as claimed in claim 3 wherein a diode is connected between the output terminal of said fourth NAND circuit and said second junction.

6. A circuit as claimed in claim 3 wherein a diode is connected across said third resistor.

7. A circuit as claimed in claim 3 wherein a first diode is connected between the output terminal of said first NAND circuit and said first junction, a second diode is connected between the output terminal of said fourth NAND circuit and said second junction, and a third diode is connected across said third resistor.

8. In a transition triggered flip-flop circuit having a setting input means and a clearing input means which produces a clearing signal output only in response to a clearing signal pulse input thereto having at least a predetermined pulse width, said clearing input means comprising a first NAND circuit having an output terminal coupled to said clearing input means and to a source of potential via a first resistor, said first NAND circuit having one input terminal coupled to a source of potential and a second input terminal connected to a junction between a second resistor and a capacitor, said second resistor and said capacitor being connected in series across a voltage source, and a second NAND circuit having an output terminal coupled to said junction, said second NAND circuit having at least two input terminals at least one of which receives said clearing signal pulse input whereby said clearing signal output is produced only when said clearing signal pulse input exceeds said predetermined width.

9. In a triggered flip-flop circuit having at least one data input and at least one clocking input, at least a first output terminal and a second output terminal, said first output terminal being coupled to the input terminals of a first logic circuit means, said second output terminal being coupled to the input terminals of a second logic circuit means, an output terminal of said first logic circuit means being coupled to a voltage source via a first resistor and a diode, and an output terminal of said second logic circuit means being coupled to said voltage source via a second resistor and said diode, a capacitor connected across said voltage source and to one electrode of said diode, the other electrode of said diode being connected to a first end of each of said first and second resistors, a second end of each of said resistors being connected respectively to the output terminal of said first logic circuit means and the output terminal of said second logic circuit means whereby the two logic circuit means are energized from the same voltage source.

10. A circuit according to claim 9 wherein said first logic circuit means and said second logic circuit means are respectively a first NAND circuit and a second NAND circuit.

11. In a transition triggered flip-flop circuit having a data input and at least one output, a clocking input means including first time constant means and first NAND circuit means for triggering said flip-flop in response to the occurrence of clock pulses having a width at least of a given predetermined width, and a clearing input means including second time constant means and a second NAND circuit means for clearing said flip-flop in response to the occurrence of clearing pulses having a width of at least a given predetermined width, whereby said flip-flop circuit is immune to pulses on its clocking input and on its clearing input which have widths less than the respective predetermined widths.

12. The circuit as claimed in claim 11 wherein said circuit has at least two output terminals, said first output terminal being coupled to the input terminals of a third NAND circuit and said second output terminal being coupled to the input terminals of a fourth NAND circuit.

13. In a transition triggered flip-flop circuit, a data input means, at least one output means, a setting input means, and time constant means and NAND circuit means coupled to said setting input means for applying a clearing input signal thereto having a width at least of a given predetermined width, whereby the flip-flop circuit may be set only by a setting signal having a width substantially equal to or greater than said predetermined width.

14. A circuit as claimed in claim 13 wherein said time constant means and said NAND circuit means comprises a first NAND circuit having an output terminal coupled to said setting input means and to a source of potential via a first resistor, said first NAND circuit having one input terminal coupled to a source of potential and a second input terminal connected to a junction between a second resistor and a capacitor, said second resistor and said capacitor being connected in series across a voltage source, and a second NAND circuit having an output terminal coupled to said junction, said second NAND circuit having at least two input terminals.

* * * * *